United States Patent
Palm

[11] Patent Number: 5,282,707
[45] Date of Patent: Feb. 1, 1994

[54] FASTENING SYSTEM FOR LOCKING NUT WITH TORQUE INDICATING MARKS

[75] Inventor: Edward B. Palm, St. Clair Shores, Mich.

[73] Assignee: Detroit Tool Industries Corporation, Madison Heights, Mich.

[21] Appl. No.: 22,146

[22] Filed: Feb. 22, 1993

[51] Int. Cl.⁵ .................. F16B 31/00; F16B 33/04; F16B 39/30
[52] U.S. Cl. .................................. 411/3; 411/14; 411/311; 29/525.1
[58] Field of Search .......................... 411/3-5, 411/14, 310, 311; 116/201, 212, DIG. 34; 73/761; 29/456, 525.1

[56] References Cited

U.S. PATENT DOCUMENTS

| | | |
|---|---|---|
| Re. 31,284 | 6/1983 | Holmes . |
| 3,603,132 | 9/1971 | Holmes . |
| 4,023,914 | 5/1977 | Holmes . |
| 4,074,950 | 2/1978 | Holmes . |
| 4,076,064 | 2/1978 | Holmes . |
| 4,150,702 | 4/1979 | Holmes . |
| 4,171,012 | 10/1979 | Holmes . |
| 4,181,457 | 1/1980 | Holmes . |
| 4,220,187 | 9/1980 | Holmes . |
| 4,258,607 | 3/1981 | McKewan . |
| 4,266,590 | 5/1981 | McKewan .............. 411/311 X |
| 4,293,262 | 10/1981 | Holmes . |
| 4,351,626 | 9/1982 | Holmes . |
| 4,396,321 | 8/1983 | Holmes . |
| 4,423,893 | 1/1984 | Holmes . |
| 4,547,104 | 10/1985 | Holmes . |
| 4,594,039 | 6/1986 | Witte .................... 411/311 |
| 4,661,031 | 4/1987 | Heine . |
| 4,682,520 | 7/1987 | Gray .................... 411/937.2 |
| 4,734,002 | 3/1988 | Holmes . |
| 4,759,237 | 7/1988 | Fauchet et al. .......... 411/3 |
| 4,826,377 | 5/1989 | Holmes . |
| 4,983,084 | 1/1991 | Gray .................... 411/311 |

OTHER PUBLICATIONS

Machinery's Handbook, by Erik Oberg, Franklin D. Jones and Holbrook L. Horton, 20th Ed., Second Printing, 1976, pp. 1274-1279, 1282-1285, 1290-1295, 1342-1343, 1360-1361 and 1218-1229.

Primary Examiner—Neill R. Wilson
Attorney, Agent, or Firm—Harness, Dickey & Pierce

[57] ABSTRACT

The present invention relates to a fastening system comprising a nut with a locking threadform and a nut driving system which visually marks the locking nut when the proper torque is reached. The locking nut with a locking threadform has been designed so that the major diameter thread of a typical bolt will engage a wedge ramp portion of the nut threadform thereby resisting unintentional loosening. The nut driving system of the present invention comprises a wrench socket wherein the socket contains a ball set; when the socket is used to tighten the locking nut, it visually marks the nut head when the proper torque is reached.

12 Claims, 7 Drawing Sheets

| FEMALE THREAD TYPE | ALUMINUM 6061-T6 NUT CLEAN DRY THREADS | | | TORLON 7130 NUT CLEAN DRY THREADS | | |
|---|---|---|---|---|---|---|
| | TORQUE (IN-LB) | AXIAL LOAD (LB) | PEAK STRESS BOLT/NUT (KSI) | TORQUE (IN-LB) | AXIAL LOAD (LB) | PEAK STRESS BOLT/NUT (KSI) |
| 10-32 UNF CLASS 3B FIT | 64 | 1733 | 87/44 | 42 | 1125 | 56/23 |
| 10-32 SPIRALOCK | 77 | 1733 | 87/47 | 52 | 1125 | 56/43 |

FASTENING SYSTEM FOR LOCKING NUT WITH TORQUE INDICATING MARKS

BACKGROUND OF THE INVENTION

This invention relates generally to a fastening system for a locking nut threadform in which a wrench socket applies a visual mark when a preset torque is reached.

Aerospace, automotive and biomechanical technologies are evolving such that engineers in these fields are pursuing more reliable, lower cost and lighter weight assembly techniques. Traditionally, the weak point in the design and manufacture of structural parts has often been the attachment system. Many situations are known where nuts and bolts have become loosened during high vibration situations, thus leading to product failure. Nowhere has this been more prevalent than in space shuttle boosters, aircraft wingplates, automotive suspension systems and prosthetic joints.

Furthermore, the process of tightening and inspecting a large set of nuts and bolts can be an expensive, tedious and mistake filled task. Currently, a mechanic must work his way along a set of nuts, serially tightening and then re-tightening the nuts, and then an inspector will check for the proper torque on each of these fasteners. Throughout both the tightening and inspection processes nuts may be missed and other nuts may be over torqued, either of which leads to premature failure.

Nevertheless, a torque-limiting system is currently being used which visually marks nuts which have a buttress threadform. This torque-limiting nut driving system uses a wrench socket containing a ball set. When the socket is used to tighten the locking nut, the ball set engages portions of the nut head and eventually penetrates through these portions when the proper torque is reached. If re-torquing is required, then a second socket with a uniquely located ball set can be used, thereby visually marking the locking nut head in a different location. The fastening process for this system has been disclosed in U.S. Pat. No. 4,881,316 entitled "Process For Setting A Threaded Torque-Limited Collar And Pin Joint," issued to Wing on Nov. 21, 1989; and, 4,858,299 entitled "Process For Making A Joint With A Torque-Limited Collar," issued to Wing on Aug. 22, 1989, both of which are incorporated by reference herewithin. The related collar or nut with the buttress threadform has been described in U.S. Pat. No. 4,784,549 entitled "Torque-Limited Collar," issued to Wing on Nov. 15, 1988, also incorporated by reference herewithin.

Furthermore, a locking nut and bolt threadform, independent from any fastening method such as the preceding, has been described in U.S. Pat. No. 4,171,012, entitled "Locking Thread Construction", issued on Oct. 16, 1979 to Holmes, incorporated by reference herewithin. Further, a similar locking threadform has been shown for a self tapping screw in U.S. Pat. No. 4,258,607, entitled "Vibration Resistant Screw", issued on Mar. 31, 1981 to McKewan, also incorporated by reference herewithin. Although both of these patents relate to a locking threadform, neither suggests using a torquing device that visually marks the locking nut.

SUMMARY OF THE INVENTION

In accordance with the present invention, a reliable, accurate and cost effective fastening system comprises a nut with a locking threadform and a nut driving system which visually marks the nut when the proper torque is reached. More specifically, the nut with the locking threadform has been designed so that the major diameter thread of a typical bolt will engage a wedge ramp portion of the nut threadform, thereby powerfully resisting unintentional loosening; a nut with the locking threadform performs substantially better in resisting vibration than does a nut with a buttress threadform. The nut driving system of the present invention further comprises a wrench socket wherein the socket contains a ball set. When the socket is used to tighten the locking nut, the ball set engages portions of the nut head and eventually penetrates through these portions of the nut head when the proper torque is reached. If re-torquing is required, then a second socket with a uniquely located ball set can be used, thereby visually marking the locking nut head in a different location.

The fastening system of the present invention, therefore, allows for fastening and inspection to occur within the same process. A quick visual inspection can be made to ascertain whether the proper torque was reached. Moreover, a permanent record of the locking nut's torquing history remains. Thus, when the drive system of the present invention is combined with the locking nut threadform of the present invention, reliability and accuracy will improve while processing costs and mistakes can be reduced.

Additional objects, advantages, and features of the present invention will become apparent from the following description and appended claims, taken in conjunction with the accompanying drawings.

BRIEF DESCRIPTION OF THE DRAWINGS

FIG. 9 is a sectional side view of the locking nut threadform of the embodiment from the present invention in FIG. 1, as it is properly applied to a bolt using the drive system of the present invention.

DESCRIPTION OF THE PREFERRED EMBODIMENT

Figure 1:
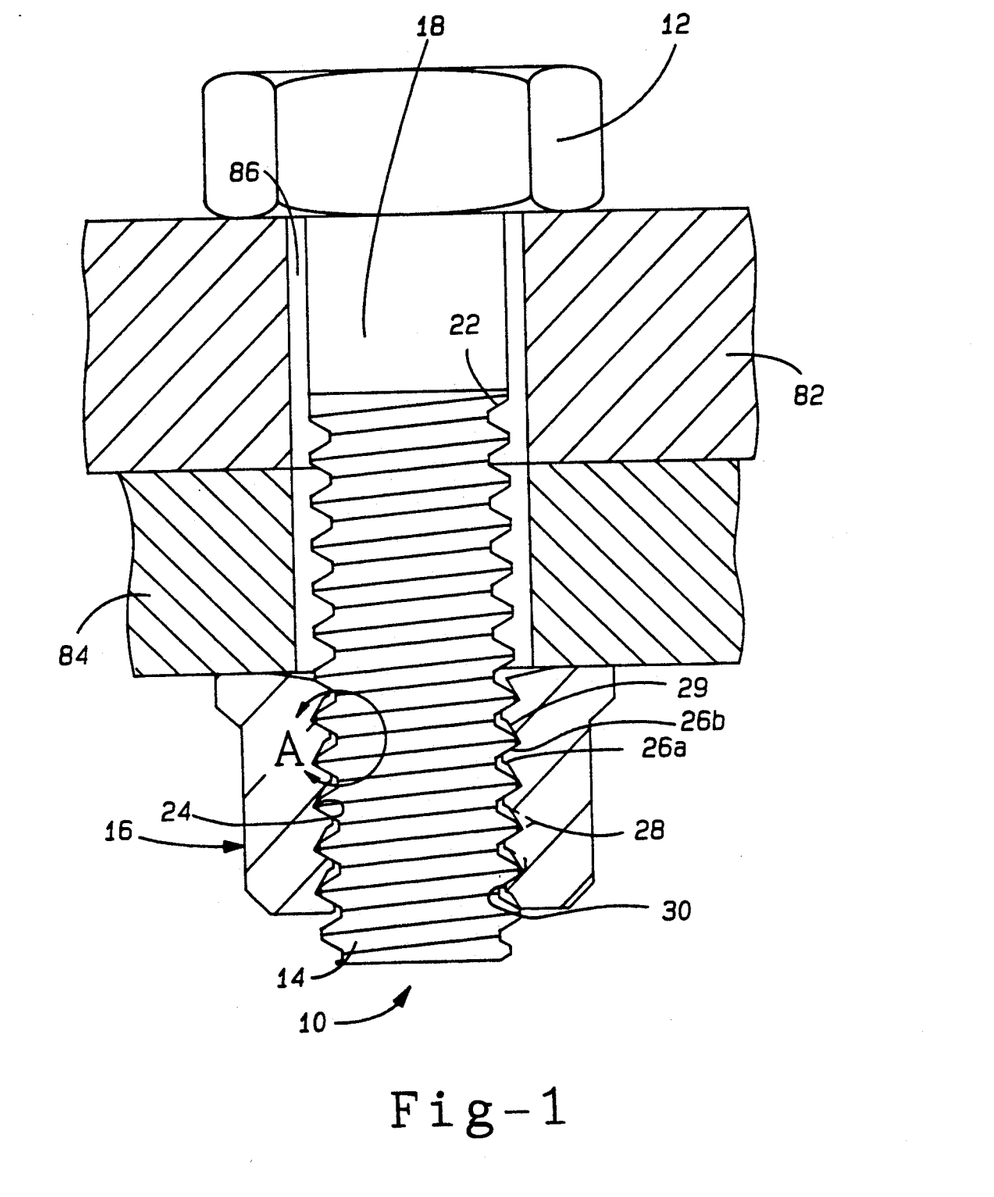
FIG. 1 is a sectional side view of the locking nut threadform of the present invention in relation to a standard bolt.

The fastening system of the present invention uses a wrench socket 64 to tighten and visually mark a locking nut attachment 16. Referring to FIG. 1, the locking nut 16 of the present invention is shown in relation to a standard bolt 10 and various layers of retained material, 82 and 84. The bolt 10 has a head 12, a bolt threadform 14 and an unthreaded middle portion 18 therebetween. The bolt 10 extends through a set of prealigned holes 86 previously drilled into the sheets of material, 82 and 84. The locking nut 16 acts against the bolt head 12 to provide sufficient clamping force to fasten the two or more sheets of material, 82 and 84.

Figure 2:
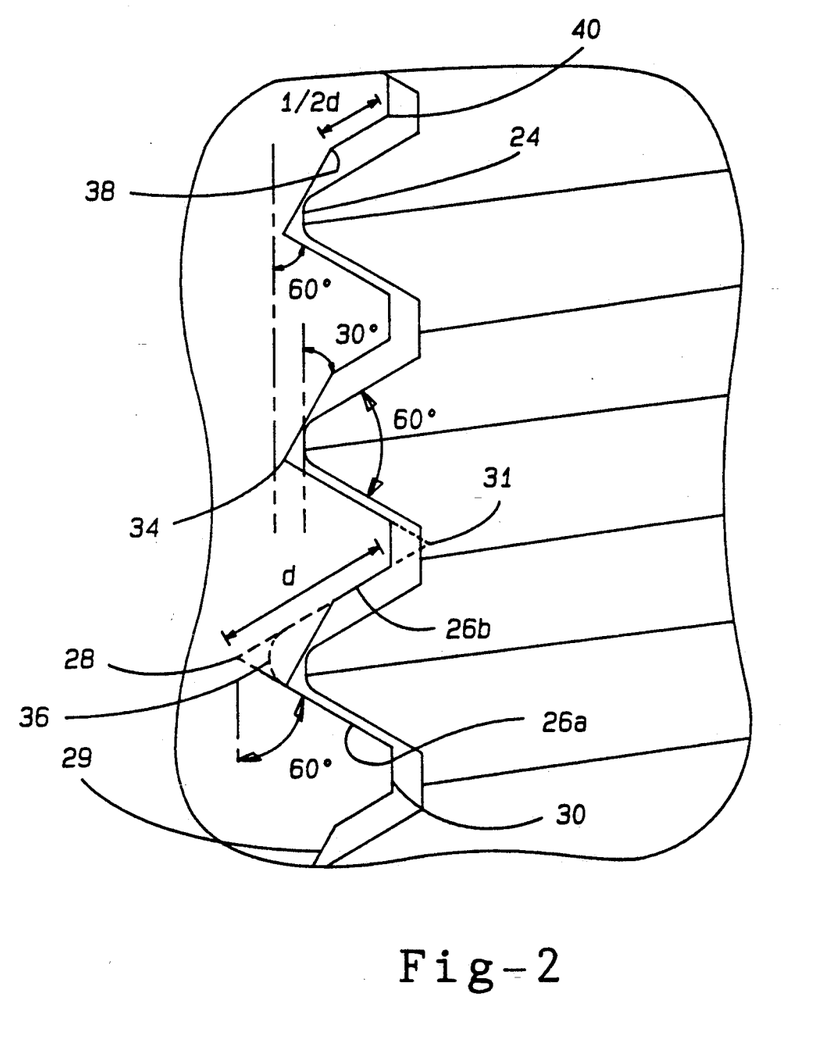
FIG. 2 is an enlargement showing the embodiment of the present invention from FIG. 1 within circular line A.
Figure 3:
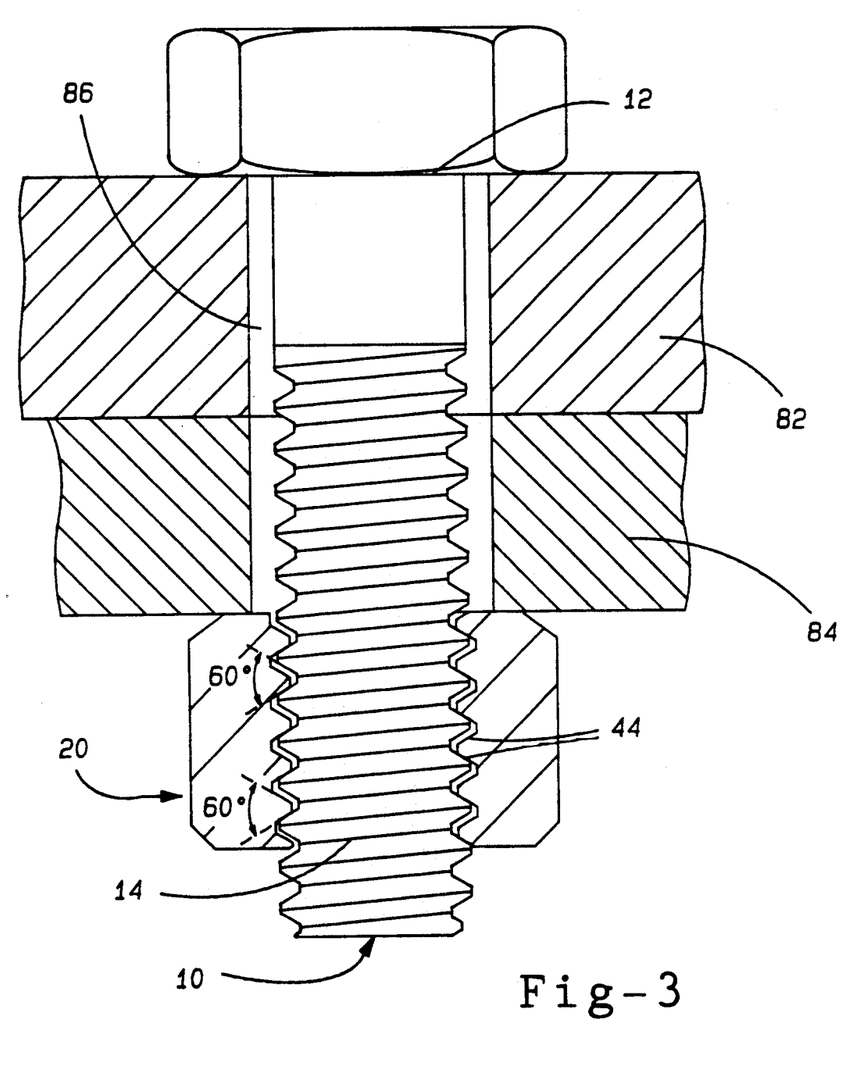
FIG. 3 is a sectional side view of a traditional nut and a traditional bolt.

The locking nut 16 is preferably a threaded fastener manufactured by Detroit Tool Industries under the registered trademark SPIRALOCK. The nut threadform pattern 14 provides the necessary means of engagement. As can be seen in FIG. 1 and FIG. 2, the locking nut form 14 has a theoretical internal thread major diameter, known as the nut root 28, where the nut flanks 26 intersect. Each nut flank 26 is 60° from the nut's center line axis. The flanks 26 meet at a flat 30 created at the theoretical nut crest 31. The threadform 14 also has a wedge ramp 29 which is inclined at a 30° angle taken from the axial center line of the nut. This wedge ramp 29 intersects nut flank 26B at point 38 which is half of the distance between point 40 and the theoretical nut root 28. The deeper end of the wedge ramp 29 intersects the other nut flank 26A at point 34 which is where the nut root contour 26 intersects the flank 26A. This can be compared with FIG. 3 which illustrates the traditional threadform between a 10-32 UNF class 3B bolt 10 and nut 20, with flanks 44 at 60° from the axial center line of the nut.

Figure 4:
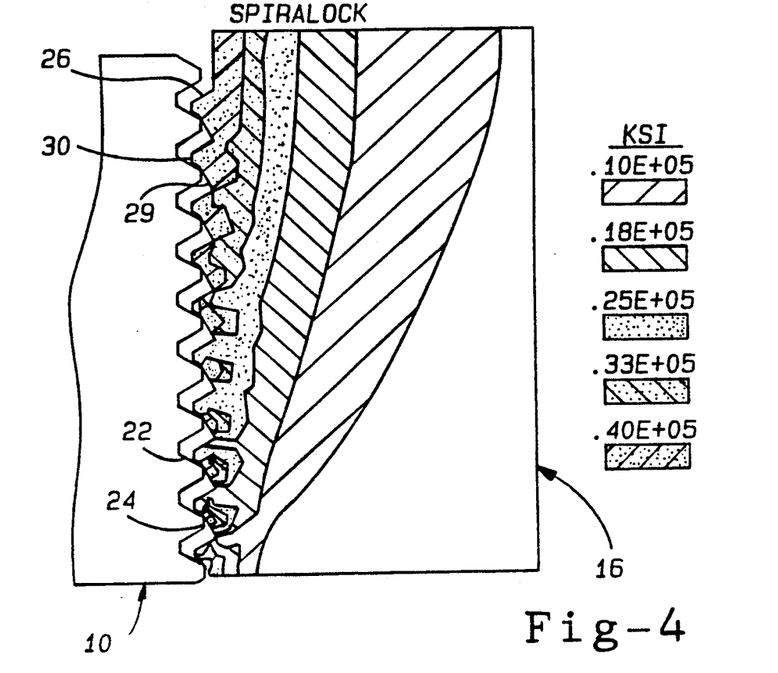
FIG. 4 is a sectional side view of the locking nut threadform of the embodiment from the present invention in FIG. 1, showing the stressed distribution when the nut is loaded.
Figure 5:
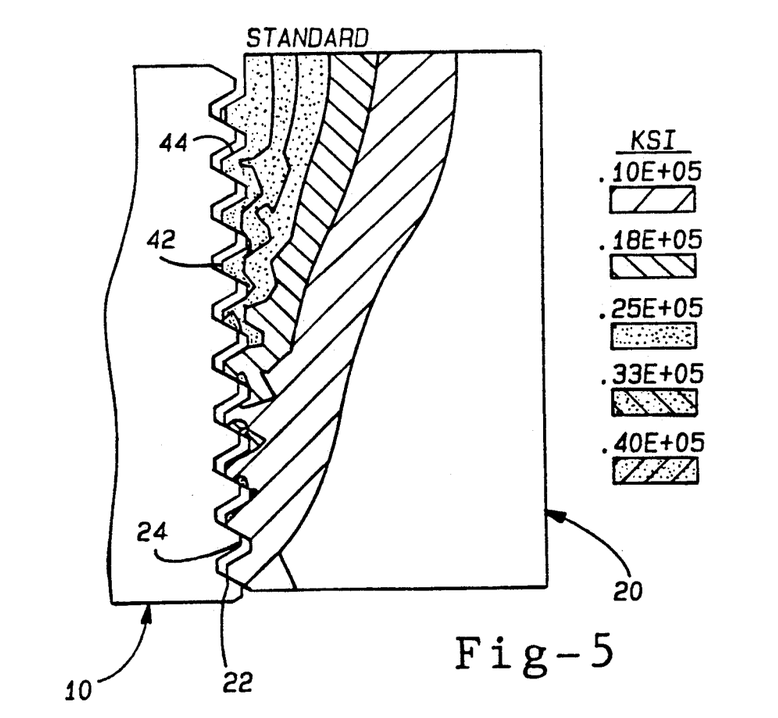
FIG. 5 is a sectional side view of a traditional nut and bolt of FIG. 3, showing the stressed distribution when the nut is loaded.
Figure 6:
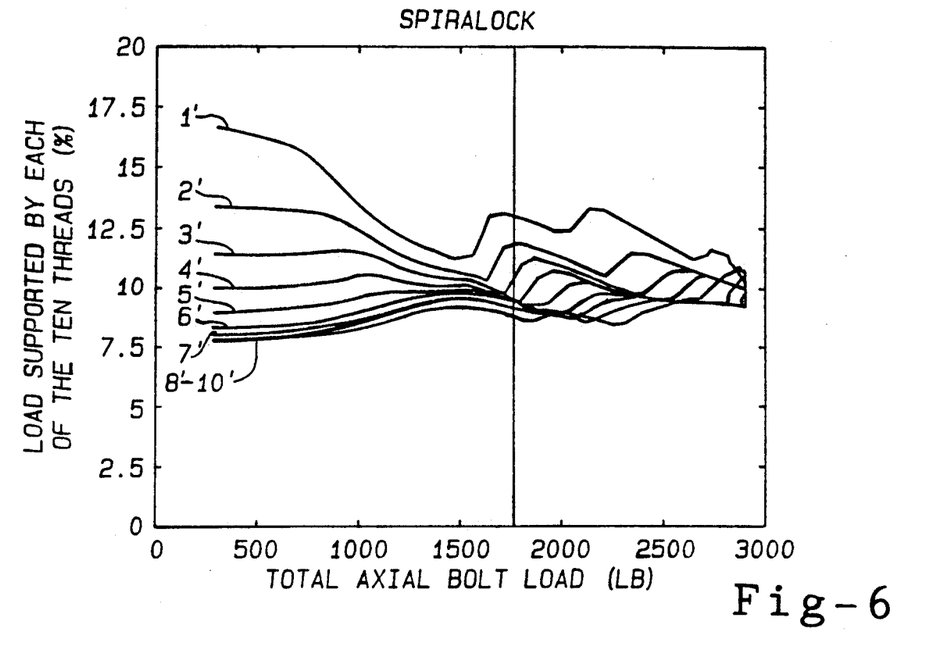
FIG. 6 is a graphic representation of the embodiment from the present invention in FIG. 1, showing the locking nut threadform loads upon each thread.
Figure 7:
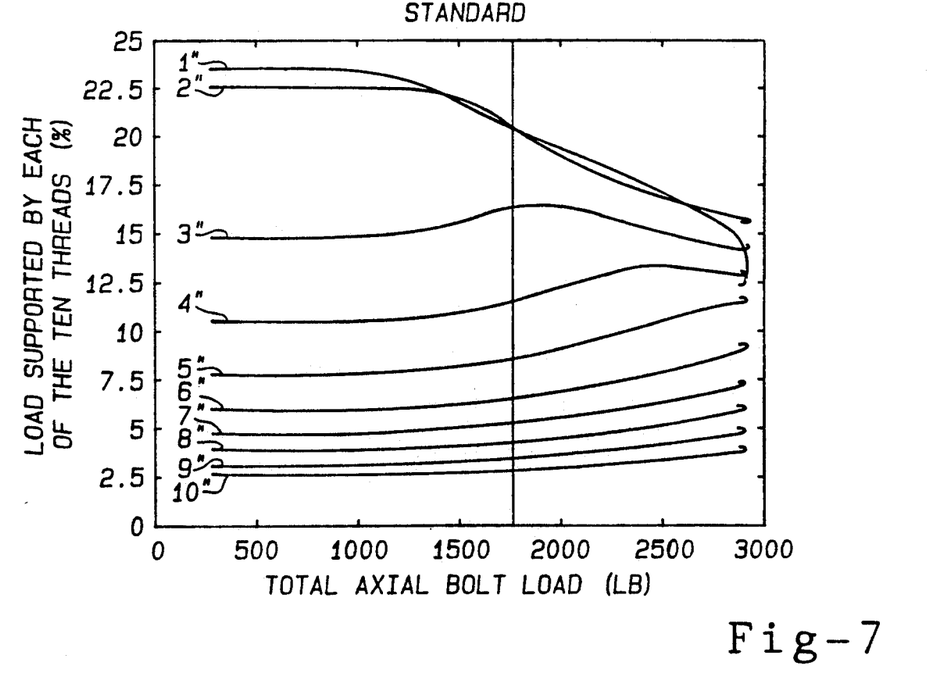
FIG. 7 is a graphic representation of a traditional nut of FIG. 3, showing the thread load distribution.

The locking feature is accomplished when the bolt's crest 24 digs into the nut wedge ramp 29. The bolt 10 is preferably a standard 60° male threaded UNF bolt. The locking threadform creates a continuous spiral contact along the entire engagement length, restricting any sideways movement due to vibration, shock, transverse or axial forces. The continuous spiral contact reduces stress concentration which significantly improves fatigue strength, thereby improving product reliability. This can best be seen in FIG. 4 which shows the stress distribution, at a 2620 pound axial load, of an aluminum 10-32 Spiralock locking nut on an annealed titanium 10-32 UNF 6A1-4V class 3B bolt. This can be compared to the highly uneven stress distribution in FIG. 5, where a standard 10-32 class 3B aluminum nut threadform and a 10-32 class 3B titanium bolt have been used. Moreover, FIG. 6 shows the load distribution for each thread of a 10-32 UNF class 3A fit annealed titanium UNF 6A1-4V bolt and a 6061-T6 aluminum Spiralock nut. The very even thread load distribution for the locking nut can be compared to the very uneven thread load distribution shown in FIG. 7. FIG. 7 graphically illustrates the thread load distribution for a 10-32 UNF class 3A titanium bolt and a non-locking aluminum 6061-T6 UNF class 3B nut; for this standard nut threads 1 and 2 receive 22% of the load while threads 7-10 receive less than 5% of the load. Thus, the locking nut threadform clearly distributes the load more uniformly throughout all of the threads than the standard UNF threadform does and, therefore, has better fatigue property.

When a structure is assembled and the sheets of material, 82 and 84, are bolted into place, a preload force should be applied that is not exceeded during the part's life. The preload force should also be sufficient to prevent the threads from loosening during vibration. Furthermore, an assembly torque should be used that stresses the bolt 10 to at least 67% of its yield stress based on the minor diameter stress area. This level of preload torque is approximately 64 inch-pounds for the UNF threads which produces an axial load of 1733 pounds with the non-locking UNF aluminum nut 20. The Spiralock locking nut 16, however, requires approximately 20% greater torque as compared to a non-locking nut 20 in order to produce a similar axial preload, therefore, the torque should be 77 inch-pounds for an aluminum locking nut 16. These torque recommendations are based on clean dry threads without lubrication, however, if the locking nuts 17 are lubricated before each use, the installation mechanic can use torque friction constants from ordinary nuts.

Figures 8, 9A, 9B, 9C:
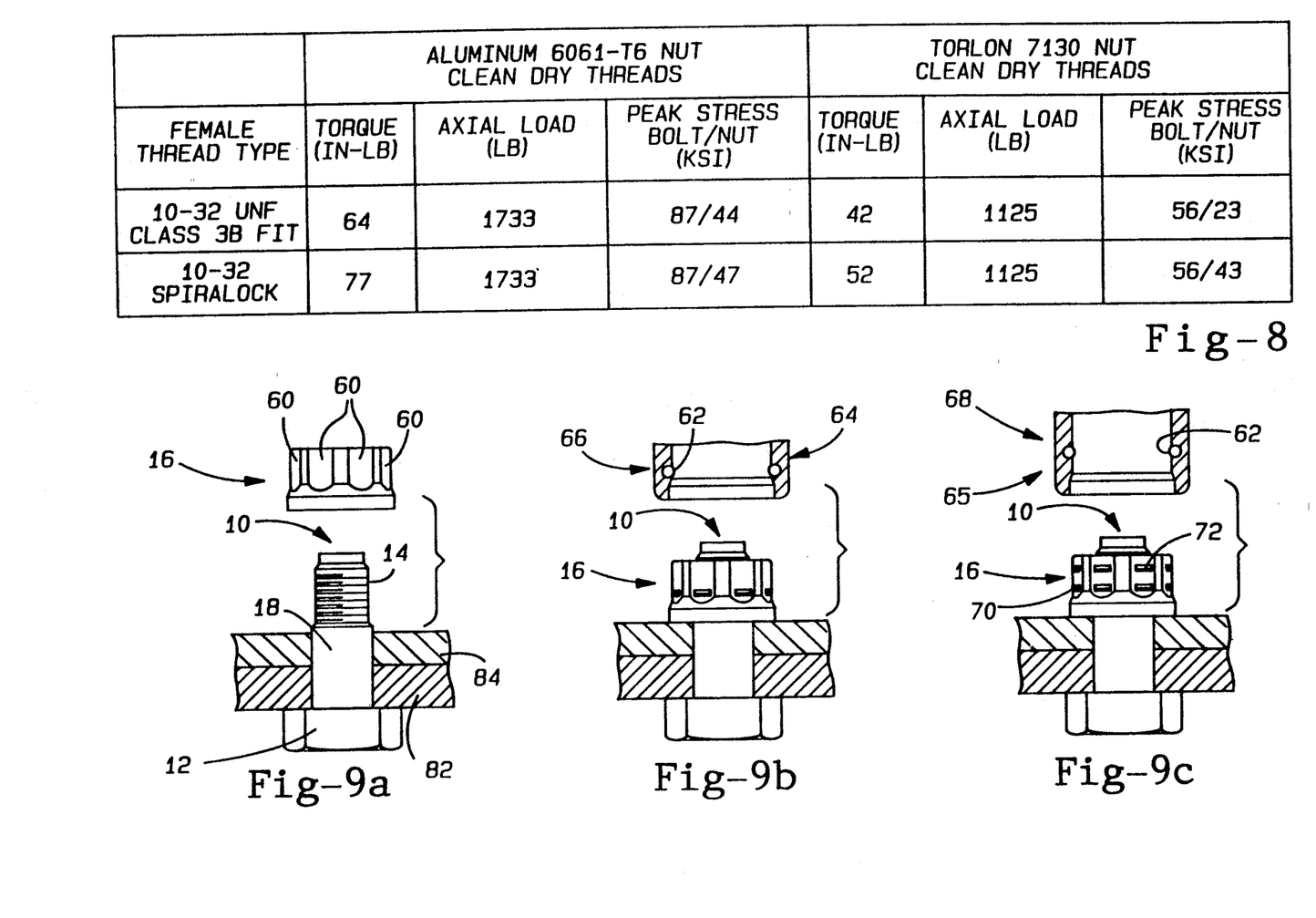
FIG. 8 is a summary of assembly preload torque and resulting axial loads for the locking nut threadform of the embodiment from the present invention in FIG. 1, and a traditional nut of FIG. 3.
Figure 10A:
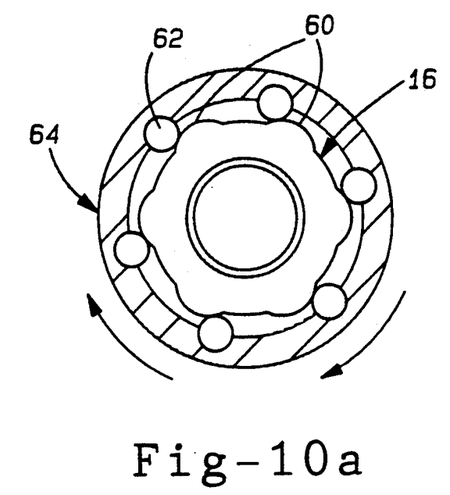
FIG. 10 is a sectional plan view of the drive system socket ball sets of the embodiment from the present invention in FIG. 9, in relation to the locking nut of the embodiment from the present invention in FIG. 1.
Figure 10B:
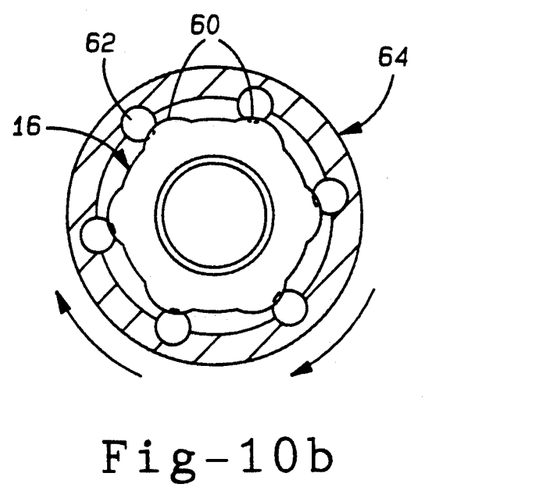
Figure 10C:
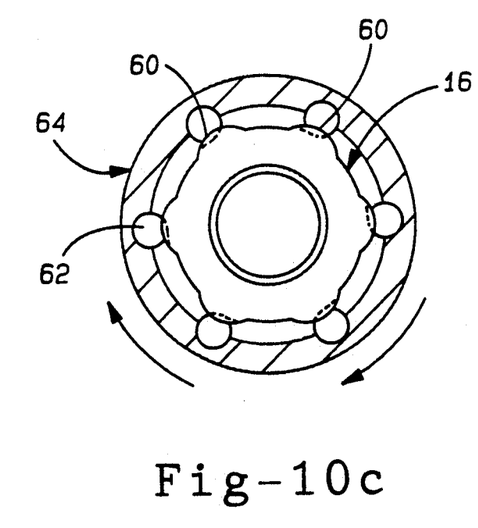
Figure 10D:
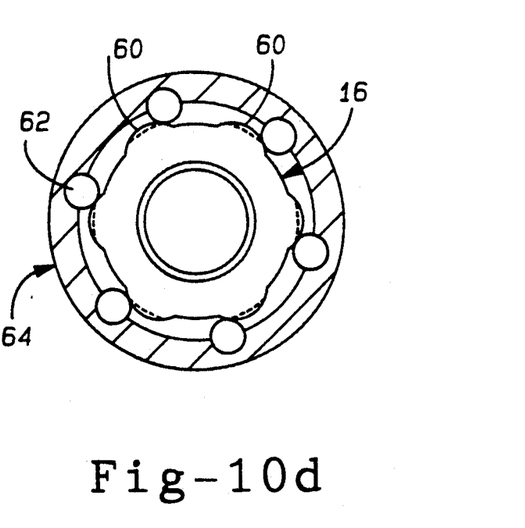

The nut drive system of the present invention preferably uses a socket 64, which is produced by Detroit Tool Industries under the registered trademark NOVA-HEX. This socket 64 fits tightly over the locking nut 16 and is attached to a wrench. Referring to FIGS. 9 and 10, the hexagonal shaped locking nut 16 is placed within the first drive socket 64 and run down upon the threaded portion 14 of the bolt 10. The first drive socket 64 contains a ball set 66 which incorporates precisely precisioned carbide balls on its internal diameter. The carbide balls of the ball set 62 bear against the locking nut's lobular flanks 60, driving the nut 16 onto the bolt 10. When the ball set 62 begins to receive torque resistance due to tension and friction, the ball set 62 digs into each lobular flank 60, penetrating deeper as resistance increases, and finally breaking through the lobes 60, producing a permanent mark on the fastener head. This visual mark indicates that the required torque for the assembly has been achieved. For second and subsequent torquing, a second drive socket 65 can be attached to the wrench. The second drive socket 65 has a different ball set 68 which is positioned higher within the socket 65. Thus, upon torquing this higher ball set 68 will also leave visual marks upon the locking nut 16. This system allows for a quick visual inspection and a permanent record of the torquing, therefore eliminating the need for redundant and often inaccurate secondary inspections and testing procedures.

It will be appreciated that the fastening system of the present invention represents a significant improvement for the installation of locking nuts. While the preferred embodiment of this fastening system has been disclosed, it will be appreciated that various modifications may be made to these parts and processes without departing from the present invention. For example, while a specific socket containing a ball set has been described, the socket may contain other means by which to provide visual marks upon the locking nut when the torque requirements are met. Furthermore while various thread angles have been specified, it will be appreciated that these angles may be varied slightly without departing from the invention. It is intended by the following claims to cover these and any other departures from these disclosed embodiments which fall within the true spirit of this invention.

The invention claimed is:

1. A fastening system for joining a plurality of material sheets, said fastening system comprising:
   a bolt, inserted through a set of aligned holes within said material sheets, with the external threadform of said bolt extending therefrom, said external threadform having bolt thread flanks therewithin;

a locking nut having a plurality of lobular flanks externally thereabout and having an internal threadform located longitudinally coincidental with said plurality of lobular flanks, said internal threadform further comprising a plurality of threads with nut thread flanks therewithin such that a typical pair of said nut thread flanks are individually disposed at a generally 60° angle from the axial center line of said locking nut, said nut thread flanks are joined by an angled wedge ramp at the root of said internal threadform, whereby the crest of said external bolt threads is wedged tightly against said wedge ramp; and a means for fastening said locking nut upon said bolt, said fastening means visually marking said lobular flanks of said locking nut upon reaching a set torque, said fastening means avoiding substantially deforming said internal threadform of said locking nut thereof.

2. The fastening system of claim 1 wherein: said external threadform of said bolt has said bolt thread flanks therewithin generally disposed at 60° angles from the axial center line of said bolt, said bolt thread flanks are joined at a root.

3. The fastening system of claim 2 wherein: said nut has a hexagonal top view shape and lobular flanks thereupon, said nut has said internal threadform with said wedge ramp therewithin disposed at an angle between 15° and 45° from the axial center line of said locking nut, said wedge ramp intersects one of said flanks at the mid-point between its crest and root, and intersects the opposing of said flanks where the major diameter root contour joins the flank of said internal threadform.

4. The fastening system of claim 3 wherein: said fastening means further comprises a wrench socket with a ball set.

5. The fastening system of claim 4 wherein: said wrench socket ball set receives torque resistance against said locking nut due to friction and tension such that said ball set penetrates into said lobular flanks of said nut, displacing metal on said lobular flanks as torque resistance increases, and finally breaks through said lobular flanks producing a permanent mark on said nut head, whereby the required torque has been visually indicated.

6. A method of fastening a locking nut to a bolt for joining a plurality of material sheets, tightened by a torque supplying wrench, the method comprising:
(a) inserting said bolt through a set of aligned holes within said material sheets, the external threadform of said bolt extending therefrom,
(b) running said locking nut down upon said bolt, said locking nut having a plurality of lobular flanks externally thereabout and having an internal threadform located longitudinally coincidental with said plurality of lobular flanks, said internal threadform further having a plurality of nut thread flanks joined by an angled wedge ramp at the root thereof, whereby the crest of said external bolt threads are wedged tightly against said wedge ramp; and
(c) tightening of said locking nut upon said bolt, to a preset torque using a means for fastening, said fastening means visually marking said lobular flanks of said locking nut upon reaching a set torque, said fastening means avoiding substantially deforming said internal threadform of said locking nut.

7. The method of claim 6, with an added step after said tightening and visual marking of step (c), further comprising:
(a) retightening of said locking nut upon said bolt, at a second and greater torque, using said fastening means which provides a second and distinguishing mark upon said locking nut once a set torque is reached.

8. The method of claim 7 wherein:
said locking nut has a hexagonal top view shape and a plurality of lobular flanks thereupon; and
said means for fastening said locking nut upon said bolt comprises a wrench socket with a ball having a plurality of balls rotatably affixed within said wrench socket.

9. The method of claim 8 wherein: said wrench socket ball set receives torque resistance against said nut such that said ball set penetrates into said locking nut's lobular flanks, thereby displacing metal on said locking nut's lobular flanks as torque resistance increases, and finally breaks through said locking nut's lobular flanks producing a permanent mark on the outside of said locking nut, whereby the required torque has been visually indicated.

10. A method of fastening a locking nut to a bolt for joining a plurality of material sheets, tightened by a torque supplying wrench, the method comprising:
(a) inserting said bolt through a set of aligned holes within said material sheets, the external threadform of said bolt extending therefrom;
(b) running said locking nut down upon said bolt, said locking nut having an internal threadform comprising a plurality of threads with nut thread flanks therewithin, each of said nut thread flanks being generally disposed at a 60° angle from the axial center line of said locking nut, said nut thread flanks being joined by an angled wedge ramp at the root of said internal threadform, whereby the crest of said external bolt threads are wedged tightly against said wedge ramp;
(c) tightening of said locking nut upon said bolt, to a preset torque using a means for fastening, whereby said fastening means visually marks said locking nut upon reaching a set torque; and
(d) retightening of said locking nut upon said bolt, at a second and greater torque, using said fastening means which provides a second and distinguishing mark upon said locking nut once a set torque is reached.

11. The method of claim 10 wherein:
said locking nut has a hexagonal top view shape and a plurality of lobular flanks thereupon; and
said means for fastening said locking nut upon said bolt comprises a wrench socket with a ball set having a plurality of balls rotatably affixed within said wrench socket.

12. The method of claim 11 wherein: said wrench socket ball set receives torque resistance against said nut due to friction and tension such that said ball set penetrates into said locking nut's lobular flanks, thereby displacing metal on said locking nut's lobular flanks as torque resistance increases, and finally breaks through said locking nut's lobular flanks producing a permanent mark on the outside of said locking nut, whereby the required torque has been visually indicated.

* * * * *